Figure 1:
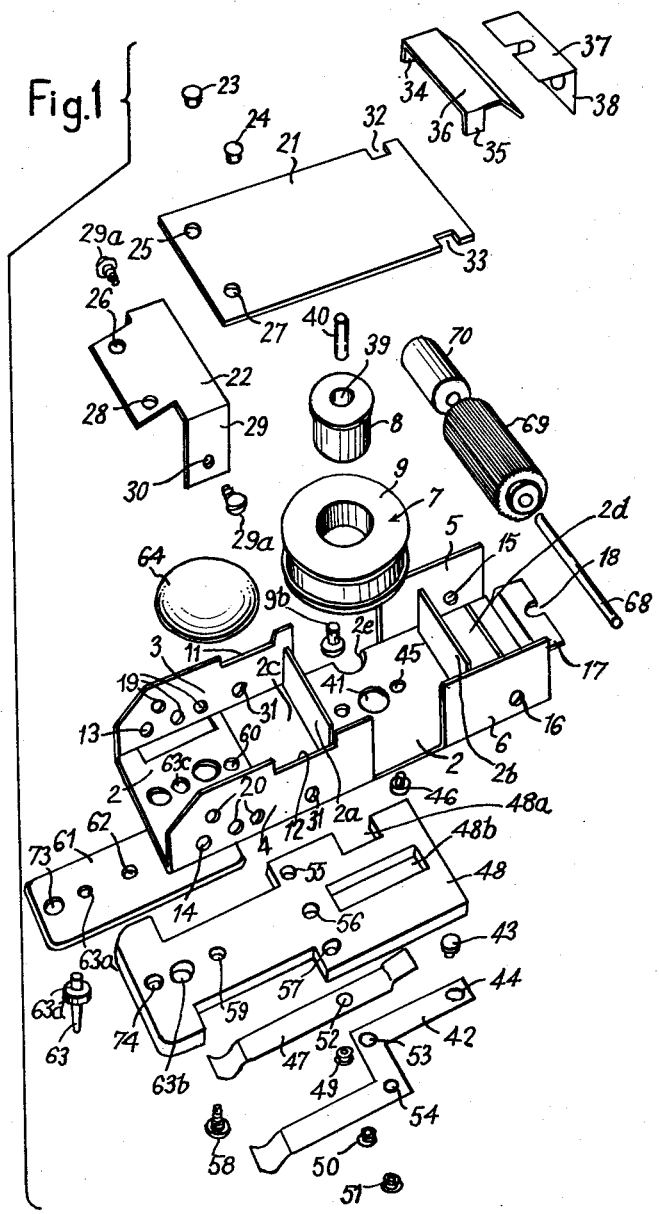

March 17, 1964   D. K. GOWLAND ETAL   3,124,902
TOY VEHICLE CHASSIS AND ELECTRIC MOTOR
Filed Nov. 16, 1959   2 Sheets-Sheet 1

Inventors
D. K. GOWLAND +
C. W. ROBINETTE
By
Holcombe, Wetherill & Brisebois
Attorneys March 17, 1964   D. K. GOWLAND ETAL   3,124,902
TOY VEHICLE CHASSIS AND ELECTRIC MOTOR
Filed Nov. 16, 1959                                    2 Sheets-Sheet 2
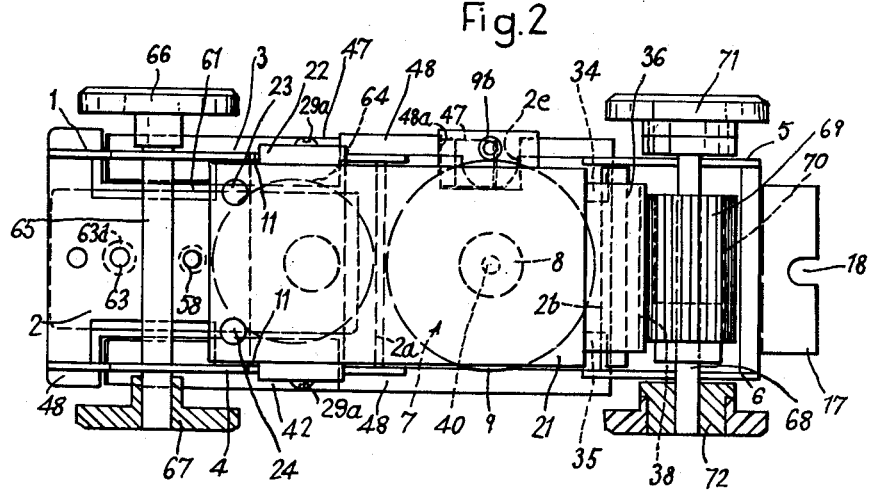
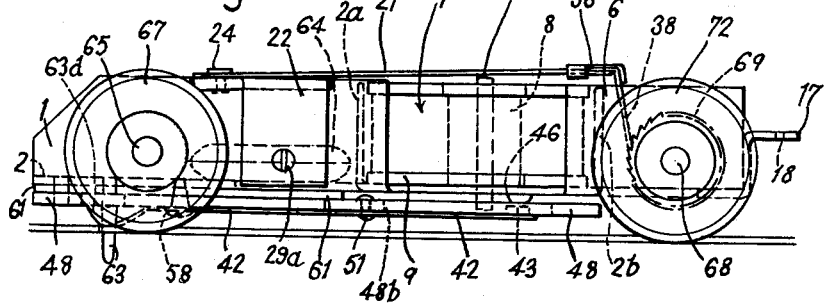
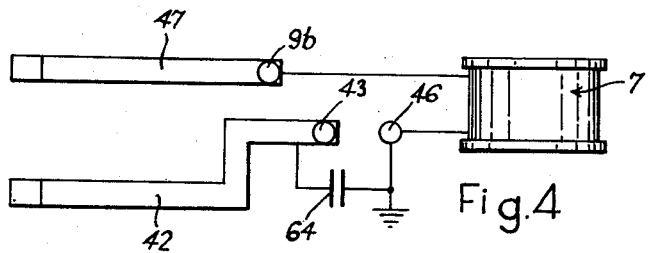
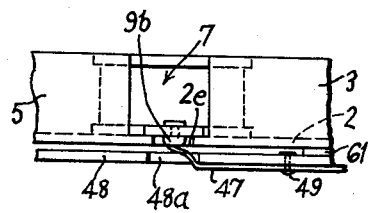
Inventors
D. K. GOWLAND +
C. W. ROBINETTE
By
Holcombe, Wetherill + Brisebois
Attorneys United States Patent Office 3,124,902
Patented Mar. 17, 1964

1

3,124,902
TOY VEHICLE CHASSIS AND ELECTRIC MOTOR
Douglas Kelvin Gowland and Carl W. Robinette, both of Kellogg Ave., Santa Barbara, Calif.
Filed Nov. 16, 1959, Ser. No. 853,046
2 Claims. (Cl. 46—243)

This invention relates to electric motors employing vibrating armatures and has particular reference to such a motor that will give a rotary motion output and be constructed for miniaturization and high power output per unit weight.

Primarily the motor of the present invention has been developed for toy vehicles, for example toy automotive vehicles, and whilst these vehicles may be self-contained and carry therein electrical batteries, the motor will in fact hereinafter be described with reference to a chassis for a toy vehicle adapted to receive power from a pair of pick-up brush conductors located on the vehicle and therefore running parallel with its path of movement. Either alternating current or direct current may be used as a motive source.

It is a general object of the present invention to produce a miniature electric motor that has a high power to weight ratio and will produce either a high or a low speed rotary motion without the use of gearing.

Another object is to provide an improved vibrator motor to produce rotary motion.

Still another object is to provide an inexpensive yet reliable motor for toy vehicles, particularly toy automotive vehicles.

A further object is to provide an improved electrically driven miniature automotive vehicle.

Other objects and advantages of this invention will be apparent from the following description and claims construed together with the accompanying drawing which form a part of the specification and in which:

FIGURE 1 is an exploded three-dimensional view of the main parts of an electric vibrating armature motor according to the invention, FIGURE 2 is a plan view of the arrangement of FIGURE 1 assembled together, FIGURE 3 is a side view of FIGURE 1, FIGURE 4 is a schematic electrical diagram of the pick-up brush conductor, electromagnet coil, contact members and capacitor, and FIGURE 5 is a view of a detail.

Referring to the drawings, there is shown a chassis for a toy automotive vehicle built up on a frame 1 which comprises a trough shaped frame shell made by stamping a sheet of metal and defined by a floor 2 and two pairs of longitudinally separated upstanding side flanges 3, 4 and 4, 6 respectively. An electromagnet coil 7 is mounted on the floor 2 in any convenient manner, for example by a screw or screws (not shown) passing through an aperture or apertures in the floor 2. Alternatively the coil may be adhered to the floor by a suitable cement or adhesive. The electromagnet coil 7 is located longitudinally between the upstanding flanges 3, 4 and 5, 6 and projects slightly laterally of the floor between the pairs of side flanges. The polepiece or core pin of the electromagnet coil 7 is shown at 8 and passes through the upper flange 9 of the coil 7 as will be seen more particularly from FIGURE 3. Upstanding transverse ears 2a and 2b are formed by stamping up the metal of the floor 2, to provide front and rear apertures 2c and 2d respectively.

The flanges 3 and 4 are provided with cut-out portions 11 and 12 and also with aligned apertures 13 and 14 and the upstanding flanges 5, 6 are provided with aligned apertures 15 and 16 respectively. The floor 2 has a rearwardly projecting bent up portion 17 which is notched at 18 so as to secure the rear part of a covering body by a screw, pin or eyelet passing therethrough. The front end of the body is secured to the chassis by pins, screws or eyelets passing through the apertures 19 and 20 provided in the upstanding flanges 3 and 4, and possibly also aperture 73 in the chassis floor.

A plate-like armature member 21 made from springy steel or other magnetic material is provided with a carrier member 22 to which it is secured by rivets 23, 24 passing respectively through apertures 25, 26 and 27, 28. The carrier member 22 has depending side flanges one of which is shown at 29 and these flanges are located in the cut-out portions 11 and 12 whereby the carrier member may be secured to the upstanding flanges 3 and 4 by screws 29a passing through an aperture 30 in each of the depending side flanges 29, and through apertures 31 provided in the upstanding side flanges 3 and 4 below the cut-out portions 11 and 12.

Thus in its mounted position the free end of the armature 21 extends over the electromagnet coil 7. At the rearward end of the armature member 21 there is provided a pair of opposed notches 32, 33 to receive depending side flanges 34, 35 of an actuator pawl clamp 36. An actuator pawl 37 of spring steel is located over the rearward end of the armature 21 and held in position by passing the flanges 34 and 35 of the clamp 36 into the notches 32 and 33 and bending said flanges underneath the armature 21. The actuator pawl 37 has a depending blade 38 which is of substantially the same width as the armature 21.

The armature assembly can thus be readily detached from the chassis.

The core pin or polepiece 8 has a longitudinal aperture 39 in which is freely located a pressure member 40 which is made from an insulating material. In the operative position, the armature 21 rests on or lies adjacent the upper part of the pressure member 40 and the lower part of the pressure member 40 passes through an aperture 41 in the floor 2 of the chassis to bear on a pick-up brush conductor 42. The rearward end of the pick-up brush conductor 42 has a contact point 43 located in an aperture 44 therein. In an aperture 45 in the floor 2 there is secured a fixed contact point 46. The contact 46 is thus connected to the chassis and may therefore be considered to be at earth potential. One end of the electromagnet coil 7 is secured either to the chassis or to the fixed contact 46 and therefore also is at earth potential. The other end of the electromagnet coil 7 is connected to a second pick-up brush conductor 47 as shown in the detail of FIGURE 5. The moving contact 43 lies opposite the fixed contact 46. The chassis floor has a notch or recess 2e through which passes a stud or eyelet 9b that is secured to the lower flange of coil 7. The coil bobbin and its flanges are made from insulting material, wherefore the stud or eyelet 9b is insulated from the chassis. The end of the wire of the coil 7 is connected to the stud 9b and the lower face of the latter is contacted by the free end of the resilient conductor 47. The pick-up brush conductors 42 and 47 are mounted beneath a pick-up holder plate 48 of insulating material by means of eyelets 49, 50 and 51 respectively passing through apertures 52 in the conductor 47, and apertures 53 and 54 in the conductor 42, and apertures 55, 56, 57 in the pick-up holder plate 48.

The pick-up holder plate 48 is secured to the chassis by means of a screw 58 passing through an aperture 59 in the pick-up holder plate 48 and into an aperture 60 in the front part of the floor 2 of the chassis. Plate 48 also has an aperture 74 in line with aperture 73. Mounted between the plate 48 and the chassis floor 2, and spacing plate 48 from floor 2 at the rear, there is a guide pin plate 61 having an aperture 62 through which also the screw 58 passes and said plate 61 also has an aperture 63a therein through which the upper part of a guide pin 63, made for example from nylon, passes. The guide pin is intended to engage a guide groove in a track upon which the vehicle is run, said track also containing electrical conductors arranged for contact by the springy pick-up brush conductors 42 and 47 so as to convey current to the motor. The pin 63 has a flange 63d secured in an aperture 63b in the plate 48 and the upper part thereof passes through an aperture 63c in the chassis floor. The plate also has a lateral notch 48a and a slot 48b respectively to allow movement for the resilient ends of pick-up conductors 47 and 42.

The electrical conductors in the track may be fed by alternating current, e.g., from a transformer connected to a main supply, or by direct current, e.g., from a battery source or from rectified alternating current. The voltage may be quite low, e.g., of the order of 6 or 12 volts. It has not hitherto been usual to energise vibrating armature motors both by direct and alternating current at will but the construction of the motor of the present invention allows the use of either kind of current as desired or available so that the motor may be termed "universal."

In order to prevent sparkover between the contacts 43 and 46 and thus suppress the motor for radio and television interference a capacitor 64 is provided which is connected between the pick-up brush conductor 42 and the chassis or fixed contact 46. Its connections have, however, not been shown in FIGURE 1 so as not to confuse the showing of the parts.

The apertures 13, 14 and 15, 16 in the upstanding side flanges 3, 4 and 5, 6 respectively are for the purpose of receiving axles for wheels. The front axle 65 carrying wheels 66 and 67 is not shown in FIGURE 1, but only in FIGURES 2 and 3. The rear axle 68 passing through the apertures 15 and 16 is provided with a pinion 69 secured thereto. Preferably the pinion 69 is made from nylon which is hard wearing and is quiet in operation and in this case the pinion is provided with a pinion weight 70 located therein: pinion 69 and weight 70 are rigidly mounted on axle 68 that is freely rotatable in the apertures 15 and 16, rear wheels 71 and 72 being rigidly secured to the axle 68. The wheels 71 and 72 are shown only in FIGURES 2 and 3. The depending blade 38 of the actuator pawl 37 operatively engages with the teeth of the pinion 69 each time that the armature 21 makes a downward movement as will be described hereinafter.

In operation, the armature 21 will initially be in, say, the uppermost position, but when electrical current is conveyed to the coil 7 by the pick-up brush contacts 42 and 47 the coil becomes energised and the polepiece 8 attracts the armature downwardly whereupon the actuator pawl 38 engages in one of the longitudinal teeth of the pinion 69 to rotate the axle 68 and thus the rear wheels 71, 72. During this movement, however, the armature 21 hits the pressure member 40 moving it downwardly so that the lower end of the member 40 presses against the upper part of the pick-up brush conductor 42 at a point slightly in front of the contact point 43 whereupon the contacts 43 and 46 are separated and the circuit is broken. The springy armature 21 therefore restores to its normal uppermost position and the springy pick-up brush conductor 42 restores the pressure member 40 to its uppermost position whereupon the contacts 43 and 46 are again placed in contact to repeat the cycle. In operation, the armature 21 therefore vibrates and on very downward stroke the pawl blade 38 engages with a tooth on the pinion 69 and thus effects substantially continuous rotation of the axle 68 and road wheels 71, 72.

Any desired kind of covering body can be secured to the chassis described by engagement of screws or the like through apertures 18, 19 and 20 but no particular body has been described herein as this is not essential to an understanding of the invention. If desired extra support brackets may be secured to the chassis by the said apertures 18, 19 and 20 and replacement bodies may be snapped over such support brackets so that the body may easily be changed for any desired purpose.

The pinion 69 is a standard commercially available pinion and all the chassis parts including the armature 21, actuator clamp 36, actuators 37 and pawl 38 can be conveniently made from metal stampings whereby the cost of the article can be kept very low.

The chassis construction described lends itself conveniently to miniaturization and can be made in any of the standard scale model sizes, e.g., gauge OO.

Owing to the construction, no gearing need be employed and the vehicle can be made to run at any speed depending on the size of pinion 69 and the electrical output of the coil 7. Owing to the direct drive and lightness of construction, the power to weight ratio is very high. The fractional horse power motor is non-reversible and has a very low consumption (80 to 100 mA.).

If the pick-up brushes and contact 43 become damaged and need replacing, only screw 58 need be removed to free the whole contact point carrying plate assembly. Similarly, if it is required to remove the armature assembly, it is only necessary to remove two screws passing through side flanges 30. The motor will have a much longer life than an ordinary rotary motor.

It will be understood that the invention is not limited by the specific description but includes any construction within the scope of the appended claims.

For example, the guide pin 63 need not have a flange 63d but be a plan peg which is a push fit in any one or more of the apertures 63a, 63b or 63c. Furthermore, reference has been made in the specific description above, to the fact that the chassis frame is formed from sheet metal. Alternatively it could be formed from the block, or cast or moulded, e.g., die cast or milled or both in non-ferrous metal or moulded in synthetic plastic. The carrier member 22 for the armature 21 could then be an integral part of the chassis frame. Since the non-ferrous chassis would not act, like the sheet metal chassis of FIGS. 1, 2 and 3, to concentrate magnetic flux where it is required, the coil 7 may in this case be provided with a flux-concentrating member of ferrous metal, e.g., soft iron adjacent thereto. This member may be, for example, of U-shape and partially surrounding the coil 7. The armature 21 may be a straight piece of spring steel. Naturally, the cast or moulded chassis may be subjected to finish-machining after formation, and it need not be cast or moulded all in one piece: several pieces could be secured together, e.g., by screws, studs, rivets or any other appropriate fixing means.

We claim:

1. The combination with a toy vehicle chassis comprising a support of trough shape having a flat base and upstanding side walls, and formed of non-ferrous material, of a vibrating armature motor comprising an energising coil mounted on said base, a member of ferrous metal located adjacent said coil for concentrating magnetic flux therein, a longitudinally-apertured polepiece mounted within said coil, an armature mounted by one end between said walls with a part thereof located above said polepiece, a pair of separable electric contacts operatively mounted on said base, means connecting said contacts in circuit with said coil, and a pressure member located in the aperture of said polepiece and moveable longitudinally by said armature for separation of said electrical contacts.

2. A toy vehicle chassis comprising a support of trough shape having a flat base and upstanding side walls, and diecast in non-ferrous metal, an energising coil mounted on said base, a member of ferrous metal located adjacent said coil for concentrating magnetic flux therein, a longitudinally-apertured polepiece mounted within said coil, an armature mounted by one end between said walls with a part thereof located above said polepiece, a pair of separable electric contacts operatively mounted beneath said base, means connecting said contacts in circuit with said coil, and a pressure member located in the aperture of said polepiece and moveable longitudinally by said armature for separation of said electrical contacts.

References Cited in the file of this patent

UNITED STATES PATENTS

| | | |
|---|---|---|
| 2,302,142 | Pettit | Nov. 17, 1942 |
| 2,317,058 | Hill | Apr. 20, 1943 |
| 2,360,666 | Fish | Oct. 17, 1944 |
| 2,481,686 | Roggenstein | Sept. 13, 1949 |
| 2,740,959 | White | Apr. 3, 1956 |
| 2,784,363 | Mosier | Mar. 5, 1957 |

FOREIGN PATENTS

| | | |
|---|---|---|
| 431,008 | Italy | Feb. 23, 1948 |
| 674,788 | Great Britain | July 2, 1952 |